United States Patent
Shultz et al.

(10) Patent No.: US 11,876,806 B2
(45) Date of Patent: *Jan. 16, 2024

(54) PROXIMITY CREDENTIAL SHARING

(71) Applicant: Apple Inc., Cupertino, CA (US)

(72) Inventors: Conrad A. Shultz, San Jose, CA (US); Alexander D. Sanciangco, San Jose, CA (US); Brent M. Ledvina, San Francisco, CA (US); Chelsea E. Pugh, San Francisco, CA (US); Kyle C. Brogle, San Francisco, CA (US); Marc J. Krochmal, Santa Clara, CA (US); Maureen G. Daum, Mountain View, CA (US); Reza Abbasian, Milpitas, CA (US); Richard J. Mondello, Mountain View, CA (US); Jacob S. Klapper, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/808,799

(22) Filed: Jun. 24, 2022

(65) Prior Publication Data
US 2023/0008448 A1    Jan. 12, 2023

Related U.S. Application Data

(63) Continuation of application No. 16/147,686, filed on Sep. 29, 2018, now Pat. No. 11,374,937.
(Continued)

(51) Int. Cl.
G06F 21/44 (2013.01)
H04L 29/06 (2006.01)
(Continued)

(52) U.S. Cl.
CPC ............ *H04L 63/107* (2013.01); *G06F 21/43* (2013.01); *G06F 21/45* (2013.01); *H04W 4/80* (2018.02)

(58) Field of Classification Search
CPC ...... H04L 63/107; H04L 63/083; H04W 4/80; G06F 21/45; G06F 21/43; G06F 2221/2111; G06F 21/35; G06F 21/41
See application file for complete search history.

(56) References Cited

U.S. PATENT DOCUMENTS 9,301,141 B1 * 3/2016 Mincher ............. H04L 63/1433
10,015,668 B2 7/2018 Hawkins et al.
(Continued)

OTHER PUBLICATIONS

Office Action in EP Appl. No. 19731837.1 dated Oct. 31, 2022, 6 pages.
(Continued)

*Primary Examiner* — Izunna Okeke
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to user authentication. In some embodiments, a first computing device receives, from a second computing device, a request for a user credential to be input into an authentication prompt associated with the second device. The first computing device determines a proximity associated with the second computing device based on a received wireless location beacon and, based on the request and the determined proximity, presents a selection prompt asking a user of the first computing device to select a user credential stored in the first computing device. The first computing device then provides the selected user credential to the second computing device to input into the authentication prompt. In some embodiments, the first computing device receives the wireless location beacon from a
(Continued)

remote controller of the second computing device and determines a proximity based on a signal strength associated with the received location beacon.

20 Claims, 9 Drawing Sheets

Related U.S. Application Data

(60) Provisional application No. 62/679,905, filed on Jun. 3, 2018.

(51) Int. Cl.
*H04L 9/40* (2022.01)
*H04W 4/80* (2018.01)
*G06F 21/45* (2013.01)
*G06F 21/43* (2013.01)

(56) References Cited

U.S. PATENT DOCUMENTS

| | | |
|---|---|---|
| 10,182,048 B1 | 1/2019 | Sabanayagam |
| 2007/0164872 A1* | 7/2007 | Monroe ............ G08B 21/0269 340/539.11 |
| 2014/0103104 A1 | 4/2014 | Jover |
| 2015/0096001 A1 | 4/2015 | Morikuni |
| 2015/0281227 A1 | 10/2015 | Fox |
| 2015/0341450 A1 | 11/2015 | Reunamaki et al. |
| 2016/0092858 A1 | 3/2016 | Giles et al. |
| 2016/0110988 A1 | 4/2016 | Nixon |
| 2016/0156719 A1 | 6/2016 | Mobarak |
| 2017/0164420 A1 | 6/2017 | Tan et al. |
| 2017/0187722 A1 | 6/2017 | Roundtree |
| 2017/0272824 A1 | 9/2017 | Bunner |
| 2018/0109908 A1 | 4/2018 | Swanson et al. |
| 2018/0337785 A1 | 11/2018 | Sanciangco et al. |
| 2018/0349593 A1 | 12/2018 | Mondello et al. |
| 2019/0053290 A1 | 2/2019 | Raju et al. |
| 2019/0205511 A1 | 7/2019 | Zhan et al. |

OTHER PUBLICATIONS

OS Security Guide—White Paper, iOS11, Jan. 2018, Apple Inc., 82 pages.

International Search Report and Written Opinion in application No. PCT/US2019/034424 issued Jul. 29, 2019, 11 pages.

* cited by examiner

*Selection Prompt 142*

| Cancel | AutoFill Password |
|---|---|
| 🔍 Search | |

*Suggested Credential 322*
- kumquat.com---bigmoney@email... www.kumquat.com ⓘ
- apricot.com---jennyappleseed www.apricot.com ⓘ
- avocados.com---bigmoney@em... avocados.com ⓘ
- bananas.com---littlemoney@email... bananas.com ⓘ
- boysenberries---jenny.a boysenberries application ⓘ
- crabapples.com---somemoney@email... crabapples.com ⓘ
- cucumbers.net---bigmoney@email... cucumbers.net ⓘ
- elderberry.com---jenny elderberry.com ⓘ
- entawak.com---bigmoney@email entawak.com ⓘ
- farkleberry.com---jenny@email.com ⓘ

*FIG. 3C*

PROXIMITY CREDENTIAL SHARING

The present application is a continuation of U.S. application Ser. No. 16/147,686, filed Sep. 29, 2018, which claims priority to U.S. Prov. Appl. No. 62/679,905, filed Jun. 3, 2018. The disclosures of each of the above-referenced applications are incorporated by reference herein in their respective entireties.

BACKGROUND

Technical Field

This disclosure relates generally to computing devices, and, more specifically, to user authentication.

Description of the Related Art

Many online services typically ask a user to create a credential, such as a username and password, when registering with a service in order to facilitate a subsequent user authentication. A user may be tempted to use a short password or reuse the same password across services because it is easier to remember the password. These practices, however, can make it easier to compromise a password and gain access to multiple accounts of a user. To discourage this behavior, a computing device may offer to maintain a user's passwords. For example, many modern web browsers may detect when a user has entered a password into a webpage and offer to store it for use in a subsequent authentication with the webpage.

BRIEF DESCRIPTION OF THE DRAWINGS

FIGS. 3A-D illustrate various examples of prompts presented to a user sharing a credential between devices.

Figure 1:
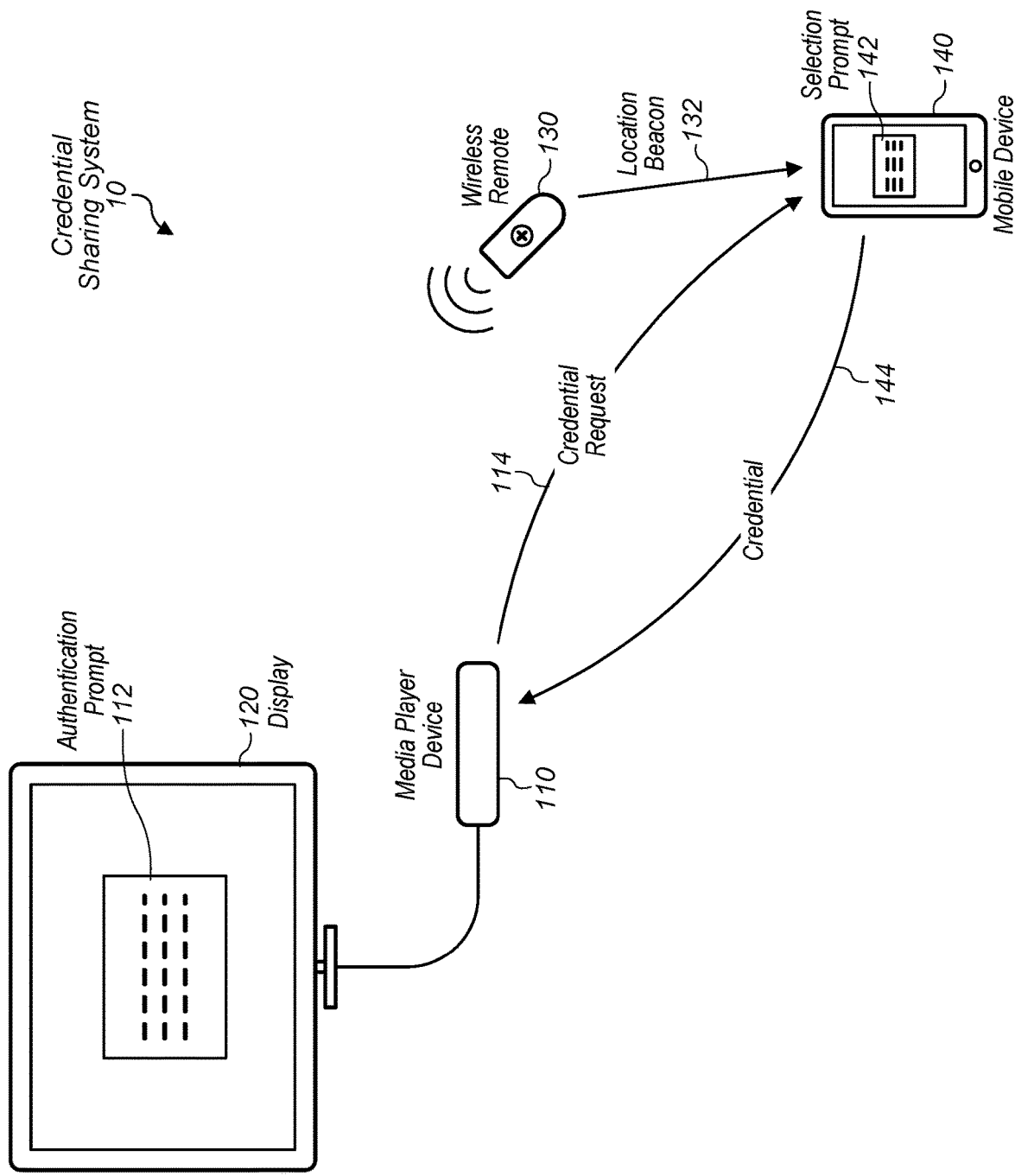
FIG. 1 is a block diagram illustrating an example of a system for sharing credentials between devices.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computing device configured to present a prompt on display" is intended to cover a device, for example, that has display pipeline circuitry and/or memory having program instructions executable by a processor to perform this function during operation, even if the device in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a mobile device may have a first credential and a second credential. The term "first" is not limited to the initial credential of the device. Accordingly, the term "first" may be used to refer to any credential on the device.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure describes embodiments in which a user may have one or more authentication credentials stored on a first computing device but is interacting with a second computing device attempting to authenticate the user. As will be described in greater detail below in various embodiments, the second computing device may be configured to send a request to nearby devices asking for them to supply a credential associated with a user authentication. In response to receiving this request, the first device may present a prompt asking the user if he or she would like to provide a stored credential to the second device. For example, in some embodiments, the second computing device may be a media player device presenting an authentication prompt on a television. Rather than entering a username and password manually via the device's remote controller, a user's nearby mobile device, for example, may present a prompt asking the user to select a stored username and password to provide to the media player device.

In order to reduce the number of potential devices responding to the second device, in various embodiments, the second device may cause a location beacon to be sent that is usable by nearby devices to determine a proximity to the second device. (As used herein, the term proximity refers generally to any suitable metric indicative of distance between two devices.) If a device determines that it is within a threshold range, it may prompt its user to select a credential to provide the second device. Otherwise, the device may ignore the request and not bother the user. Thus, a person located, for example, in the same room as the media player device noted above may receive a prompt on his or her mobile device, but a person located in another room may not be bothered in spite of his or her mobile device receiving the credential request. Still further, in some embodiments, the location beacon is sent from a remote controller of the second device as the remote controller may be closer to the user being authenticated and thus allow for a smaller threshold range to be considered by nearby devices—thus reducing the number of potentially responding devices and bothered users. In other embodiments, however, the location beacon may be sent by the second device or another peripheral associated with the second device.

Turning now to FIG. 1, a block diagram of a credential sharing system 10 is depicted. In the illustrated embodiment, system 10 includes a media player device 110 coupled to a display 120, a wireless remote controller 130, and a mobile device 140. In some embodiments, system 10 may be implemented differently than shown—e.g., display 120 may be integrated into device 110, mobile device 140 may be one of a plurality of devices 140, remote 130 may not be present, etc.

Media player device 110, in various embodiments, is a device configured to present content on a display 120. In the illustrated embodiment, this content may include various media played on display 120, which may be a television in some embodiments. Device 110, however, may correspond to any suitable computing device such as laptop or notebook computer, personal computer system, desktop computer, a server system, mainframe computer system, tablet computer, handheld computer, workstation, network computer, a mobile phone, music player, personal data assistant (PDA), wearable device, internet of things (IoT) device, etc. In some embodiments, media player device 110 includes a wireless interface configure to communicate with a wireless remote controller 130 (or simply remote 130), which may receive various input from and provide indications of the inputs to device 110 to control operation of device 110. Remote 130 may support any of various wireless protocols such as infrared (IR), Bluetooth™, Wi-Fi™, ultra-wide band (UWB), etc. Although various functionality will be described below with respect to remote 130, this functionality may be performed by some other peripheral device associated with device 110 such as a wireless keyboard, mouse, speaker, some other device paired to device 110, etc.

In some instances, media player device 110 may present an authentication prompt 112 soliciting a credential for authenticating a user. In some embodiments, this prompt 112 is provided by an application executing on device and provided to authenticate with respect to a service. This service may pertain to, for example, accessing content maintained by an application, enabling functionality of an application, logging into an application, etc. This service may also pertain to accessing information located externally from media player device 110. For example, prompt 112 may be presented by an application associated with a streaming service and executable to stream various video content to media player device 110. In some embodiments, prompt 112 is presented by a web browser executable to render webpages on display 120—thus, authentication prompt 112 may correspond to an authentication page for a website. In other embodiments, device 110 may not present any prompt when soliciting a credential 144—e.g., device 110 may not have a display, device 110 may determine to forgo presenting a prompt 112 if a mobile device 140 with a relevant credential can be identified, etc.

Mobile device 140, in various embodiments, is configured to maintain various credentials 144, which may be relevant to authentication prompt 112. These credentials 144 may include any suitable type of credential such as a username and password, one-time password (OTP), personal identification number (PIN), a digital signature generated by a cryptographic key, authentication token, etc. Although described as a mobile device 140, device 140 may correspond to any suitable device such as those noted above with respect to media player device 110. As shown in FIG. 1, mobile device 140 may receive a credential request 114 along with a location beacon 132 and present a corresponding selection prompt 142 for selecting a credential 144 to provide to media player device 110.

In various embodiments, media player device 110 sends a credential request 114 to one or more nearby devices in responsive to a user providing some input to device 110 via remote 130. For example, a user may navigate one or more menus depicted on display 120 resulting in the presentation of authentication prompt 112, and request 114 may be sent in response to the user selecting a field in authentication prompt 112 via remote 130. In some embodiments, request 114 may be sent as a broadcast (i.e., a communication not directed to any device in particular) and may be generic advertisement for a credential 144 as information about the specific desired credential 144 may be conveyed later once a secure connection is established with a device responding to request 114. In other embodiments, however, request 114 may be directed to one or more specific devices 140 and/or include additional information about the desired credential 144 such as discussed below with respect to FIG. 2.

As noted above, location beacon 132 may be conveyed to nearby devices in order for them to determine whether to respond to a credential request 114. In various embodiments, mobile device 140 uses a location beacon 132 to determine a proximity associated with media player device 110. In some embodiments, this determination is includes receiving, from a radio of mobile device 140, an indication of the signal strength (e.g., a relative signal strength indication (RSSI)) associated with the received location beacon 132 and comparing the signal strength with a threshold value. If the signal strength satisfies the threshold value (meaning mobile device 140 is in a sufficient range), device 140 may determine to notify the user of device 140 about the request 114. If the signal strength does not satisfy the threshold, mobile device 140 may determine to ignore the received request 114. In the illustrated embodiment, location beacon 132 is sent from remote 130 as it may allow a higher threshold to be used since remote 130 may be closer to mobile device 140 than media player device 110. In other embodiments, however, location beacon 132 may be conveyed by media player device 110 or some other peripheral of device 110. For example, one or more other neighboring devices may send a location beacon 132 to mobile device 140—or convey some other form of location information such as a packet identifying a location determined by one of the neighboring devices. These neighboring devices may also any suitable radio access technology (RAT) such as infrared (IR), Bluetooth™, Wi-Fi™, ultra-wide band (UWB), etc. In still other embodiments, other techniques may be used to determine whether a mobile device 140 is within a threshold range of media player device 110 such as being able to access a common wireless access point (WAP) (or common Wi-Fi™ network), using global position system (GPS), using cellular network connectivity, etc.

If mobile device 140 determines to notify the user of device 140 about a request 114, device 140 may present one or more prompts to a user such as a selection prompt 142. In various embodiments, selection prompt 142 presents a list of credentials 144 stored on mobile device 140 and allows a user to select one of the credentials 144 to provide it to media player device 110. In some embodiments, selection prompt 142 may further suggest a particular credential 144 determined to be relevant to authentication prompt 112. In some embodiments, mobile device 140 also presents a device authentication prompt asking the user to supply an input usable to authenticate mobile device 140 to media player device 110. For example, in one embodiment, the prompt may ask a user to enter code depicted on display 120; however, other techniques may be used as discussed below. In some embodiments, mobile device 140 also performs a local authentication of the user before permitting a credential 144 to be provided media player device 110. Such an authentication may include verifying a user's passcode, biometric, etc. Examples of various prompts that may be presented by mobile device 140 are discussed in further detail below with respect to FIGS. 3A-3D.

After a user has selected a credential 144 from selection prompt 142, mobile device 140 may provide the credential 144 to media player device 110 as shown in FIG. 1. In various embodiments, in response to receiving credential 144, media player device 110 may automatically populate one or more fields in the authentication prompt 112 with the credential 144. In some embodiments, media player device 110 may further automatically submit content of the populated one or more fields in response to receiving credential 144. In other embodiments, however, a user may be required to select a button using remote 130 to submit a credential 144. An exemplary exchange between devices 110, 130, and 140 is described in greater detail below with respect to FIG. 2.

Figure 2:
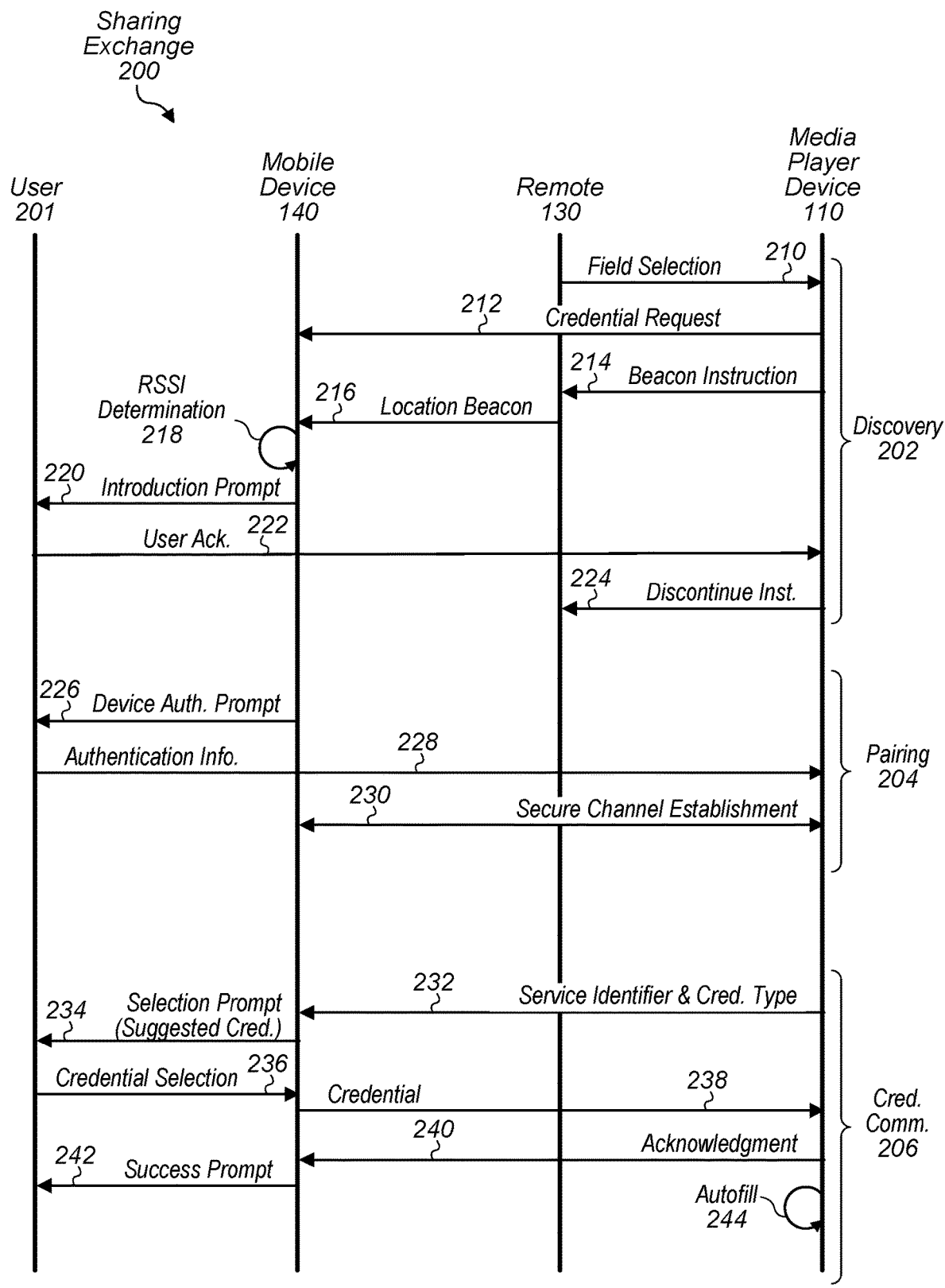
FIG. 2 is a communication diagram illustrating an example of an exchange between devices sharing credentials.

Turning now to FIG. 2, a communication diagram of an exchange 200 for sharing a credential 144 is depicted. In the illustrated embodiment, exchange 200 includes a discovery phase 202, pairing phase 204, and credential communication phase 206. In other embodiments, exchange 200 may be implemented differently—e.g., steps may be performed in a different order, concurrently, or omitted.

Discovery phase 202, in various embodiments, is the initial phase in which media player device 110 attempts to discover nearby devices, which may be interested in sharing a credential 144 with media player device 110. In the illustrated embodiment, phase 202 begins at 210 with a user providing an input to remote 130 that selects a field in authentication prompt 112. In response to receiving an indication of this selection, media player device 110 broadcasts a credential request 114, which is received by mobile device 140 at 212. Media player device 110 also sends a beacon instruction to remote 130 at 214 to cause remote 130 to start sending a location beacon 132 at 216. In response to receiving the beacon 132, mobile device 140 performs an RSSI determination 218 in which mobile device 140 determines a proximity by comparing the RSSI of the received beacon 132 with a threshold value. If the RSSI is satisfies the threshold value, mobile device 140 presents an introduction prompt at 220 (discussed below with respect to FIG. 3A) asking a user 201 if he or she wants to share a credential 144. If the user indicates in the affirmative, an indication may be provided at 222 by mobile device 140 to media player device 110, which sends an instruction to remote 130 to discontinue sending a location beacon 132 at 224. Exchange 200 then proceeds to pairing phase 204.

Pairing phase 204, in various embodiments, is an intermediary phase in which devices 110 and 140 authenticate one another and establish a secure communication channel. In the illustrated embodiment, phase 204 begins at 226 with mobile device 140 presenting an device authentication prompt (discussed below with respect to FIG. 3B) asking user 201 to input authentication information, which is conveyed to media player device 110 at 228 in order to authenticate mobile device 140 and media player device 110. In some embodiments, media player device 110 presents a value on display 120, and the device authentication prompt asks user 201 to input the value into the prompt; however, in other embodiments, other techniques may be used. After confirming the authentication information, media player device 110 establishes a secure/encrypted channel with mobile device 140 at 230 to protect subsequent communications between devices 110 and 140. In some embodiments, this may include performing a Diffie-Hellman (DH) key exchange to establish a cryptographic key for encrypting and decrypting subsequent communications. Exchange 200 then proceeds to credential communication phase 206.

Credential communication phase 206, in various embodiments, is the last phase in which a selected credential 144 is communicated. In the illustrated embodiment, phase 206 begins at 232 with media player device 110 providing, via the secure channel, information about authentication prompt 112 such as a service identifier and a credential type. The service identifier, in various embodiments, indicates a particular service for which authentication prompt 112 is being presented. Accordingly, if a prompt 112 is being presented to authenticate for a service associated with a website, the service identifier may identify the particular website by specifying, for example, a domain, a uniform resource locator (URL), internet protocol (IP) address, etc. If prompt 112 is being presented to authenticate for a service provided by an application executing on media player device 110, the service identifier may identify the particular application by specifying, for example, the name of the application, the name of application's executable file, the directory path to the executable file, etc. The credential type, in various embodiments, identifies the type of credential 144 being solicited by authentication prompt 112 such as a username and password, OTP, PIN, digital signature generated by a cryptographic key, authentication token, etc. At 234, mobile device 140 presents a credential selection prompt 142 (discussed below with respect to FIG. 3C), which may include a suggested credential 144 determined to be relevant based on the information received at 232. In some embodiments, mobile device 140 may further authenticate user 201 by verifying a user's passcode, biometric, etc. before presenting the selection prompt 142. Once user 201 has selected a credential 144 from the selection prompt 142 at 236, mobile device 140 provides the selected credential 144 at 238. In some embodiments, media player device 100 may send an acknowledgement at 240 that the credential 144 was successful received and a corresponding success prompt (discussed below with respect to FIG. 3D) may be presented at 242 to user 201. At 244, media player device 110 automatically fills one or more fields in authentication prompt 112 with the contents of the credential 144. In embodiments in which a prompt 112 is not presented, media player device 110 may convey the credential 144 to the service attempting to authenticate the user in some other manner.

Figure 3A:
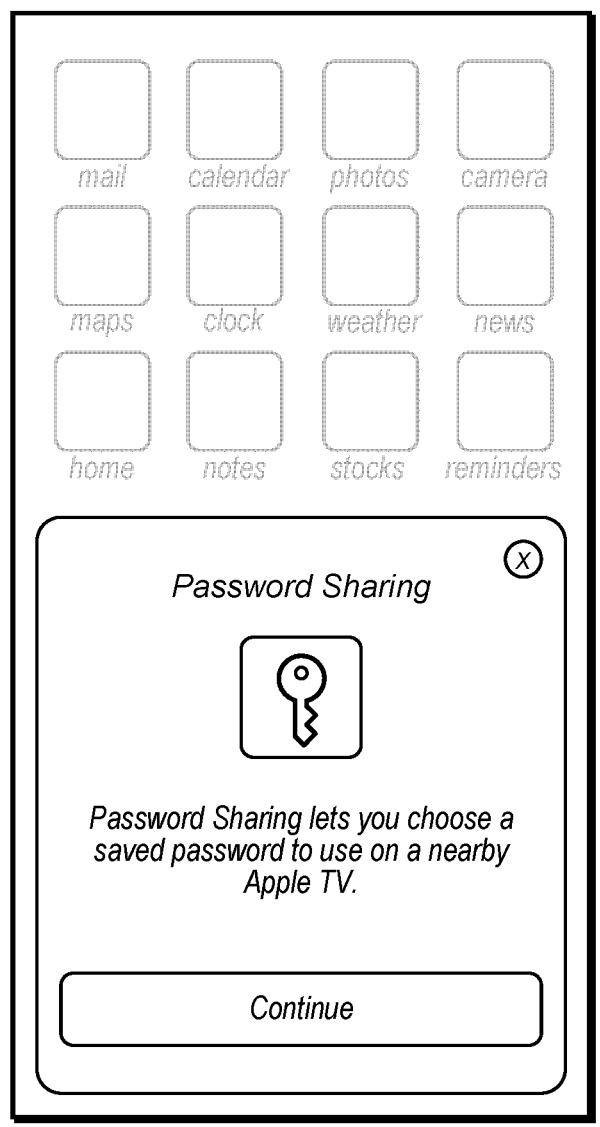

Turning now to FIG. 3A, a diagram of an introduction prompt 300 is depicted. As noted above, introduction prompt 300 may be an initial prompt presented during discovery phase 202 and used to confirm that a user is interested in sharing a credential 144. In the illustrated embodiment, prompt 300 includes a "continue" button selectable by a user to indicate to the media player device 110 that he or she is interested in sharing a credential 144. Otherwise, a user can select the "X" button to dismiss the prompt 300. In some embodiments, introduction prompt 300 may be implemented different than shown—e.g., prompt 300 may be a banner descending from the top of the screen.

Figure 3B:
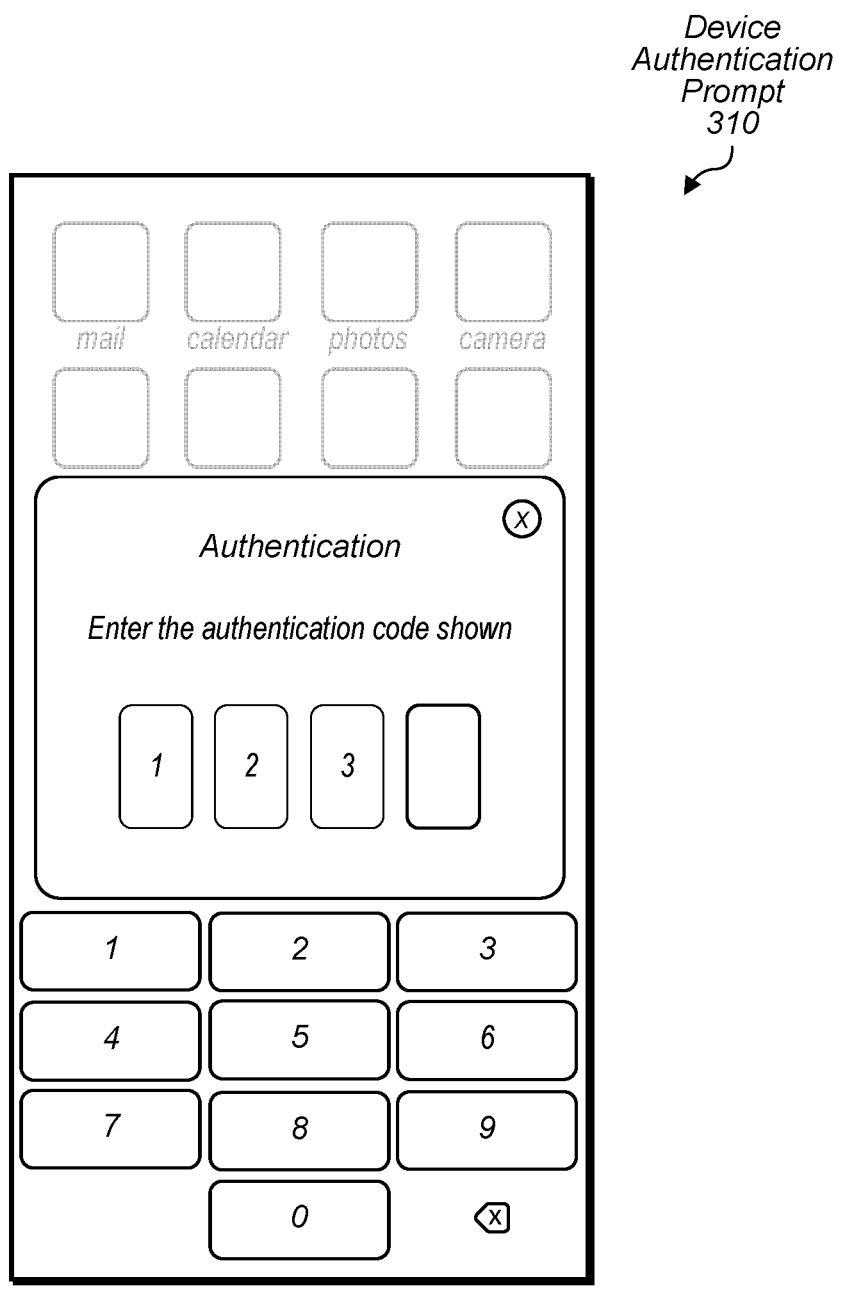

Turning now to FIG. 3B, a diagram of a device authentication prompt 310 is depicted. As noted above, device authentication prompt 310 may be presented during pairing phase 204 to authenticate mobile device 140 and media player device 110. In the illustrated embodiment, prompt 310 asks the user to enter a four-digit value depicted on display 120 in order to authenticate devices 110 and 140. Such an authentication may be performed, for example, to prevent someone who not able to view display 120 from interfering with media player device 110. In some embodiments, authentication prompt 310 is performed during each exchange 200. In other embodiments, the authentication may be persisted across multiple exchanges 200—e.g., mobile device 140 may receive a token from media player device 110 to use in lieu of prompt 310.

In other embodiments, mobile device 140 and media player device 110 may authenticate differently than shown in FIG. 3B. For example, in some embodiments, media player device 110 may present a QR code, particle cloud, etc. on display 120, and prompt 310 may instruct the user to capture it with a camera of mobile device 140. In some embodiments, media player device 110 may play a sound with a watermark, and mobile device 140 may capture the watermark via microphone of device 140 to authenticate with media player device 110. In some embodiments, device 110 and 140 may be authenticated based on both devices being registered with the same cloud-based user account.

Turning now to FIG. 3C, a diagram of a selection prompt 142 is depicted. As noted above, selection prompt 142 may be presented during the credential selection phase 206 to allow a user to select a credential 144 to provide to media player device 110. In the illustrated embodiment, selection prompt 142 presents a list of credentials 144 maintained by mobile device 140 as well as a suggested credential 322. Accordingly, selecting the credential for apricot.com, for example, may cause media player device 110 to receive the credential 144 and to populate the username field in prompt 112 of FIG. 1 with "jennyappleseed" and the password field with the corresponding password. In some embodiments, suggested credential 322 may be determined based on information received during phase 206 such as the service identifier and credential type. In other embodiments, suggested credential 322 may be determined based on a most frequently used credential 144, last recently used credential 144, etc. If the depicted portion of the credential list does not include the desired credential, a user may scroll through the list or enter an input into the depicted search field to search for the desired credential. In the illustrated embodiment, selecting the 'i' icon may allow a user to view additional information about the credentials 144 such as the credential type, service identifier, etc.

Figure 3D:
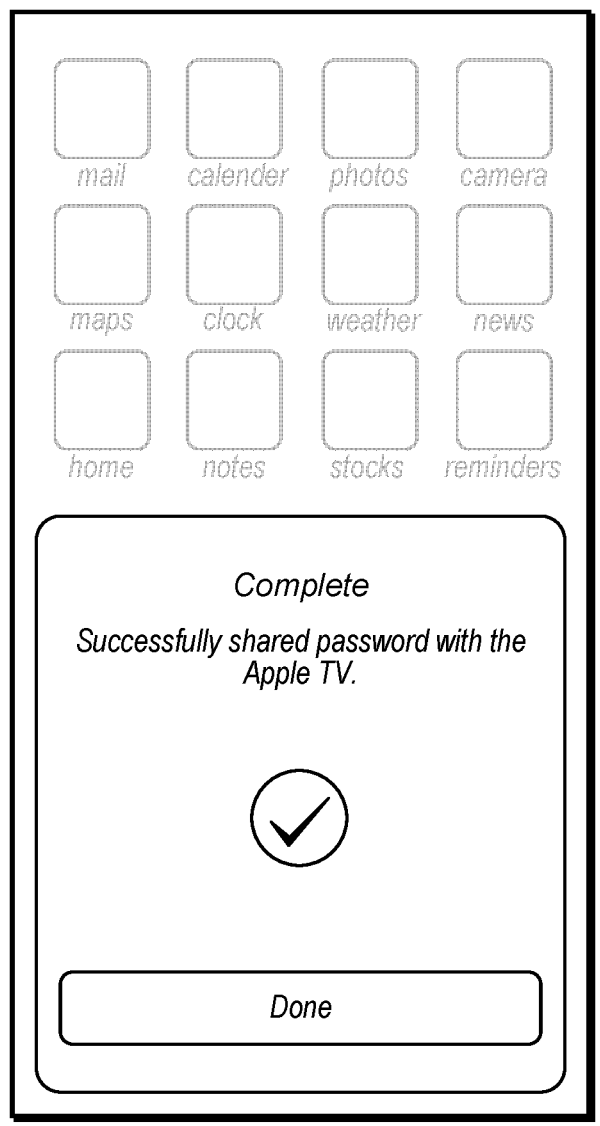

Turning now to FIG. 3D, a diagram of a success prompt 330 is depicted. As noted above, success prompt 330 may be presented on mobile device 140 during selection phase 206 in response to device 140 successfully sharing a credential 144 with media player device 110. In the illustrated embodiment, success prompt 330 announces the success of the credential sharing and has a "Done" button to acknowledge the prompt. In some embodiments, however, success prompt 330 may be implemented differently than shown—e.g., it may be banner dropping down from the top, may not have an acknowledgment button, etc. In still other embodiments, a success prompt 330 may not be presented.

Figure 4A:
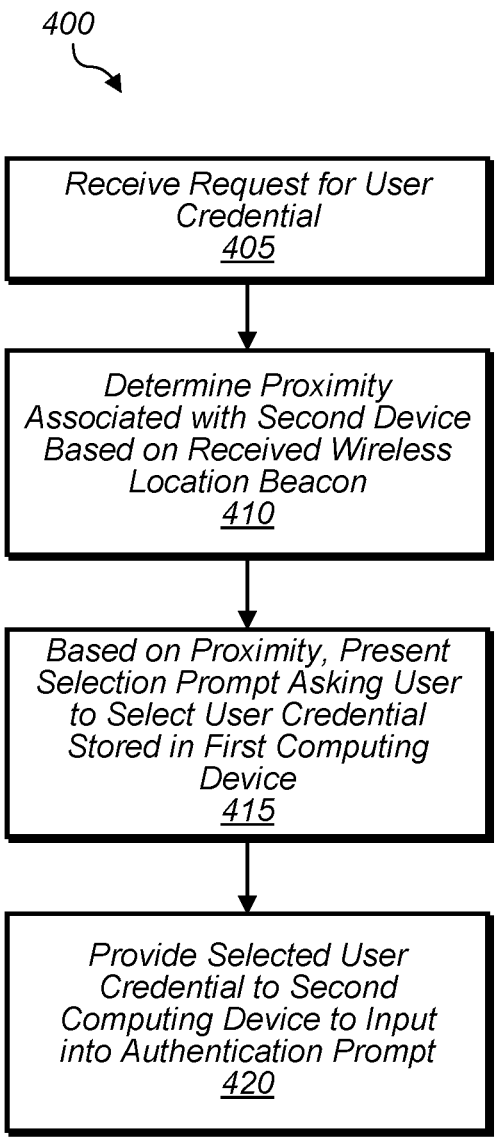
FIG. 4A-C are a flow diagrams illustrating exemplary methods for sharing credentials.

Turning now to FIG. 4A, a flow diagram of a method 400 for sharing a credential is depicted. In some embodiments, method 400 is performed by a first computing device in possession of credential such as mobile device 140. In some embodiments, steps 405-420 may be performed concurrently or in a different order than shown.

In step 405, a request (e.g., request 114) is received from a second computing device (e.g., media player device 110) for a user credential (e.g., credential 144) to be input into an authentication prompt (e.g., prompt 112) associated with the second computing device.

In step 410, a proximity associated with the second computing device is determined based on a received wireless location beacon (e.g., location beacon 132). In some embodiments, the first computing device receives the wireless location beacon from a remote controller (e.g., remote 130) of the second computing device, and determining the proximity includes determining a proximity to the remote controller based on a signal strength associated with the received wireless location beacon. In some embodiments, the first computing device receives a relative signal strength indication (RSSI) from a radio of the first computing device that received the wireless location beacon and compares the received RSSI with a threshold value.

In step 415, based on the request and the determined proximity, a selection prompt (e.g., selection prompt 142) is presented asking a user of the first computing device to select a user credential stored in the first computing device. In some embodiments, the first computing device stores a plurality of user credentials in the first computing device, receives an indication of a desired user credential from the second computing device, and based on the indication, selects one of the plurality of user credentials to suggest (e.g., credential suggestion 322) to the user within the selection prompt. In some embodiments, the indication identifies an application executing on the second computing device. In some embodiments, the indication is a domain associated with a website being accessed by a web browser of the second computing device. In some embodiments, the indication is received after an encrypted channel has been established between the first computing device and the second computing device.

In step 420, the selected user credential is provided to the second computing device to input into the authentication prompt. In some embodiments, the first computing device presents a prompt (e.g., device authentication prompt 310) asking the user to supply an input usable to authenticate the first computing device to the second computing device, and based on the input, establishes an encrypted channel (e.g., secure channel at 230) with the second computing device such that the selected user credential is provided via the encrypted channel. In some embodiments, the prompt asking the user to supply an input usable to authenticate the first computing device asks the user to input a value that is depicted on a display (e.g., display 120) associated with the second computing device. In various embodiments, method 400 further includes the first computing device receiving, from the second computing device, another request for a user credential to be input into an authentication prompt and, in response to determining that the first computing device is not proximal to a remote controller of the second computing device, determining to ignore the other request.

Figure 4B:
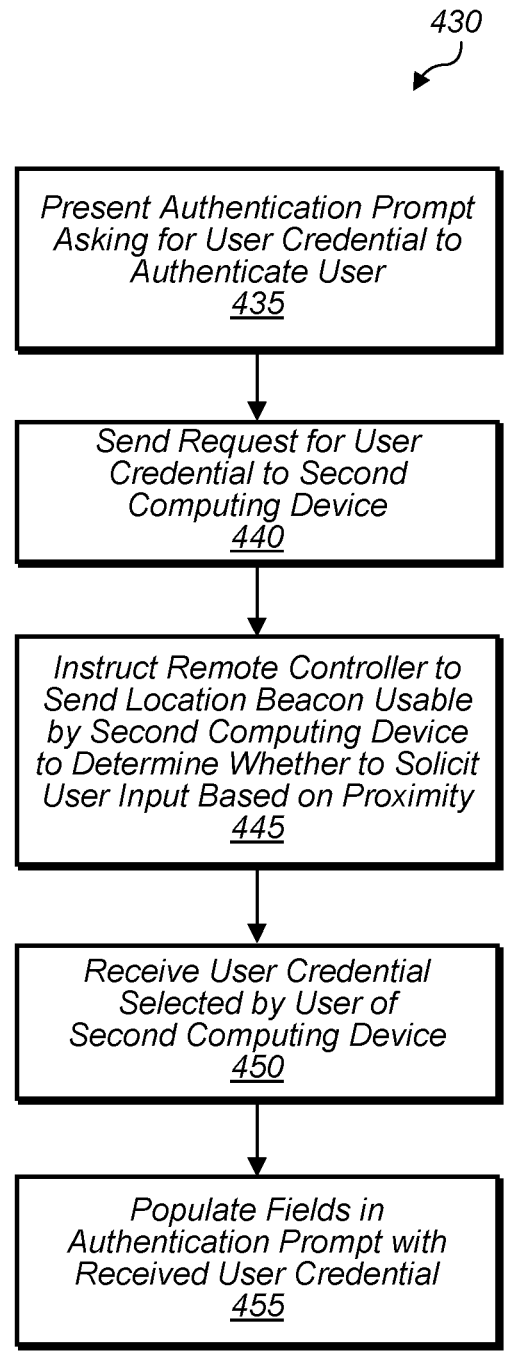

Turning now to FIG. 4B, a flow diagram of a method 430 for sharing a credential is depicted. In some embodiments, method 430 is performed by a first computing device presenting an authentication prompt such as media player device 110. In some embodiments, steps 435-455 may be differently than shown—e.g., steps may be performed concurrently or steps may be performed in a different order than shown, steps may be omitted such as steps 435 and 455, etc.

In step 435, an authentication prompt (e.g., prompt 112) asking for a user credential (e.g., credential 144) to authenticate a user is presented. In some embodiments, the first computing device receives an input from a remote controller (e.g., remote controller 130), determines that the input selects a field within the authentication prompt, and, in response to the determining, performs steps 440 and 445.

In step 440, a request (e.g., request 114) is sent for the user credential to a second computing device (e.g., mobile device 140). In some embodiments, the first computing device executes an application associated with a streaming service, and the authentication prompt is usable to authenticate the user to the streaming service. In such an embodiment, the first computing device sends, to the second computing device, an indication (e.g., a service identifier at 232) of the application to cause the second computing device to suggest a user credential (e.g., suggested credential 322) associated with the application for selection by the user. In some embodiments, the first computing device presents a web page including the authentication prompt and sends, to the second computing device, an indication (e.g., service identifier at 232) of a domain name associated with the web page to cause the second computing device to suggest a user credential (e.g., suggested credential 322) associated with the domain name for selection by the user.

In step 445, the remote controller is instructed (e.g., via a beacon instruction at 214) to send a location beacon (e.g., location beacon 132) usable by the second computing device to determine whether to solicit user input based on a threshold distance between the remote controller and the second computing device.

In step 450, a user credential selected by a user of the second computing device is received from the second computing device. In some embodiments, method 430 includes the first computing device presenting a prompt specifying a value (e.g., authentication information at 228) for the user to input into the second computing device to authenticate the second computing device and, in response to the user inputting the value into the second computing device (e.g., in device authentication prompt 310), establishing a secure channel (e.g., a secure channel at 230) with the second computing device to receive the selected user credential.

In step 455, one or more fields in the authentication prompt are populated (e.g., autofill at 244) with the received user credential. In some embodiments, the first computing device automatically submits, to an authentication service, content of the populated one or more fields in response to receiving the selected user credential.

Figure 4C:
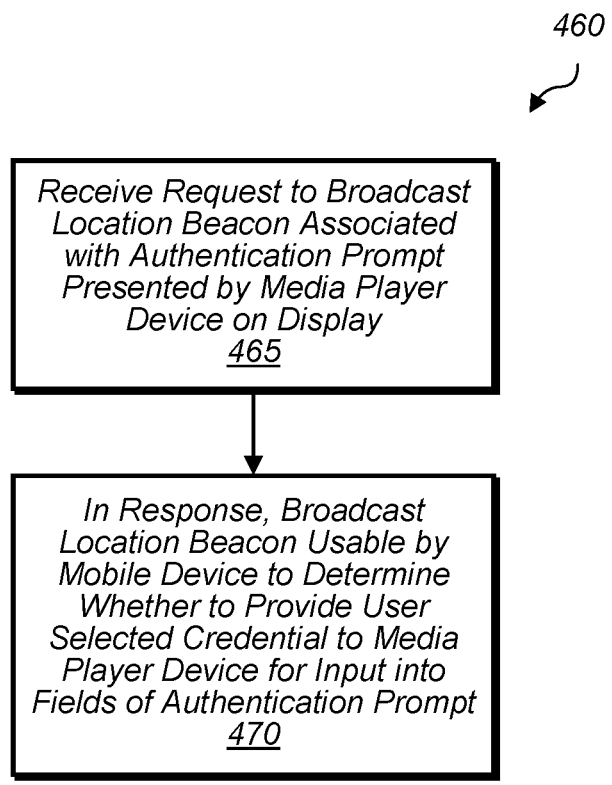

Turning now to FIG. 4C, a flow diagram of a method 460 for sharing a credential is depicted. In some embodiments, method 460 is performed by a remote controller such as remote controller 130.

In step 465, a remote controller of a media player device (e.g., media player device 110) receives a request (e.g., beacon instruction at 214) to broadcast a location beacon (e.g., location beacon 132) associated with an authentication prompt (e.g., prompt 112) presented by the media player device on a display (e.g., display 120). In some embodiments, method 460 includes the remote controller receiving, from a user, an input selecting an authentication field in the authentication prompt and the remote controller sending an indication of the input (e.g., field selection at 210) to the media player device. In such an embodiment, the request to broadcast the location beacon is received in response to sending the indication of the input.

In step 470, the remote controller broadcasts, in response to the request, the location beacon to a mobile device (e.g., mobile device 140). In various embodiments, the location beacon is usable by the mobile device to determine whether to provide a user selected credential (e.g., credential 144) to the media player device for input into one or more fields of the authentication prompt. In some embodiments, a signal strength associated with the broadcasted location beacon is used by the mobile device to determine a proximity the remote controller, and the mobile device determines whether to prompt a user to select the user credential (e.g., via a selection prompt 142) based on the determined proximity. In some embodiments, method 460 includes the remote controller receiving, from the media player device, an indication (e.g., discontinue instruction at 224) that the mobile device has contacted the media player device and, in response to the indication, the remote controller discontinuing broadcasting the location beacon.

Exemplary Computer System

Figure 5:
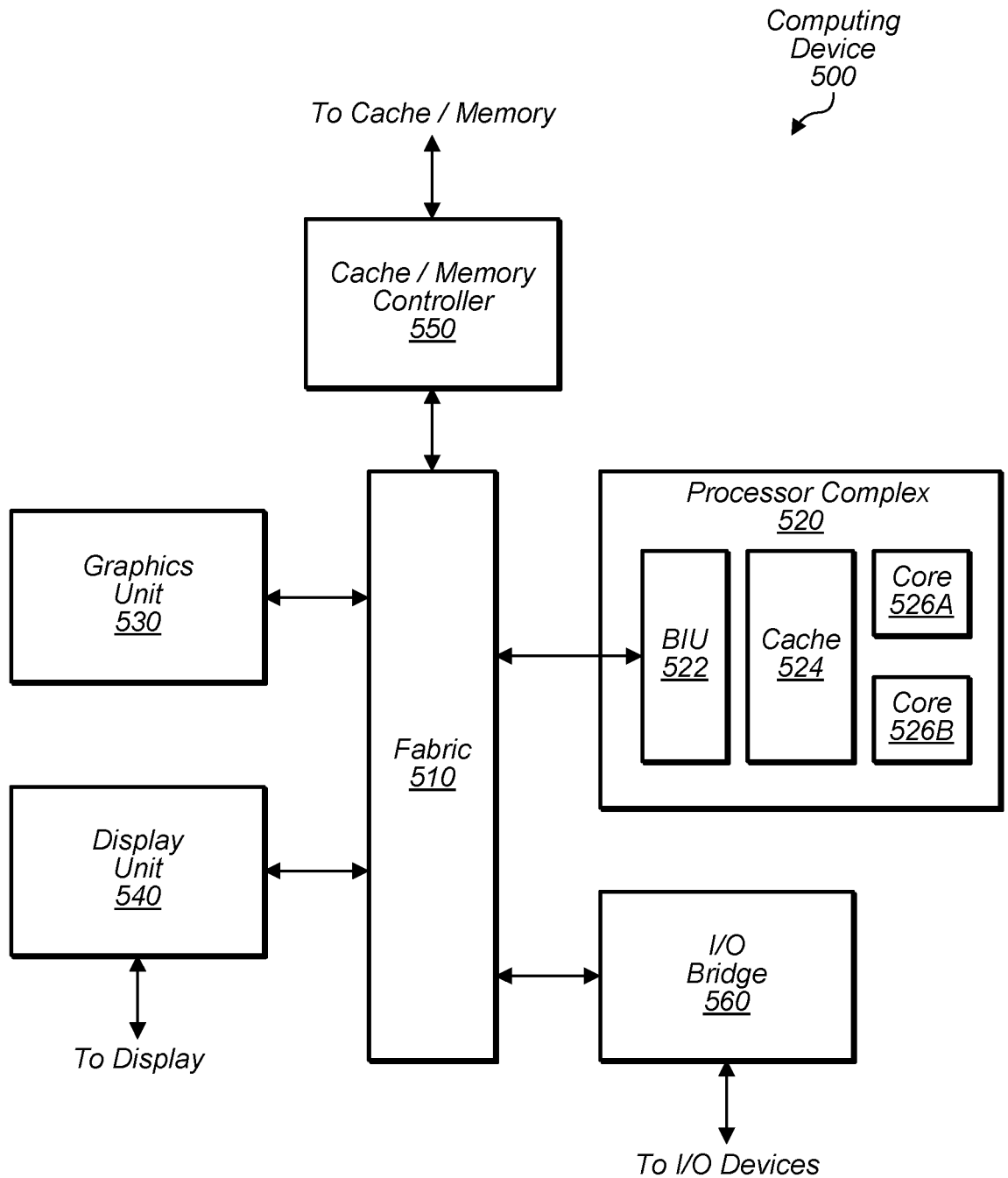
FIG. 5 is a block diagram illustrating one embodiment of an exemplary computer system.

Turning now to FIG. 5, a block diagram illustrating an exemplary embodiment of a computing device 500, which may implement functionality of devices 110-140, is shown. Device 500 may correspond to any suitable computing device such as those noted above with respect to FIG. 1. In the illustrated embodiment, device 500 includes fabric 510, processor complex 520, graphics unit 530, display unit 540, cache/memory controller 550, input/output (I/O) bridge 560. In some embodiments, elements of device 500 may be included within a system on a chip (SOC).

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally. As used herein, the term "coupled to" may indicate one or more connections between elements, and a coupling may include intervening elements. For example, in FIG. 5, graphics unit 530 may be described as "coupled to" a memory through fabric 510 and cache/memory controller 550. In contrast, in the illustrated embodiment of FIG. 5, graphics unit 530 is "directly coupled" to fabric 510 because there are no intervening elements.

In the illustrated embodiment, processor complex 520 includes bus interface unit (BIU) 522, cache 524, and cores 526A and 526B. In various embodiments, processor complex 520 may include various numbers of processors, processor cores and/or caches. For example, processor complex 520 may include 1, 2, or 4 processor cores, or any other suitable number. In one embodiment, cache 524 is a set associative L2 cache. In some embodiments, cores 526A and/or 526B may include internal instruction and/or data caches. In some embodiments, a coherency unit (not shown)

in fabric 510, cache 524, or elsewhere in device 500 may be configured to maintain coherency between various caches of device 500. BIU 522 may be configured to manage communication between processor complex 520 and other elements of device 500. Processor cores such as cores 526 may be configured to execute instructions of a particular instruction set architecture (ISA), which may include operating system instructions and/or application instructions to implement functionality described herein with respect to devices 110-140. These instructions may be stored in computer readable medium such as a memory coupled to memory controller 550 discussed below.

Graphics unit 530 may include one or more processors and/or one or more graphics processing units (GPU's). Graphics unit 530 may receive graphics-oriented instructions, such as OPENGL®, Metal, or DIRECT3D® instructions, for example. Graphics unit 530 may execute specialized GPU instructions or perform other operations based on the received graphics-oriented instructions. Graphics unit 530 may generally be configured to process large blocks of data in parallel and may build images in a frame buffer for output to a display. Graphics unit 530 may include transform, lighting, triangle, and/or rendering engines in one or more graphics processing pipelines. Graphics unit 530 may output pixel information for display images.

Display unit 540 may be configured to read data from a frame buffer and provide a stream of pixel values for display. Display unit 540 may be configured as a display pipeline in some embodiments. Additionally, display unit 540 may be configured to blend multiple frames to produce an output frame. Further, display unit 540 may include one or more interfaces (e.g., MIPI® or embedded display port (eDP)) for coupling to a user display (e.g., a touchscreen or an external display) such as display 120.

Cache/memory controller 550 may be configured to manage transfer of data between fabric 510 and one or more caches and/or memories. For example, cache/memory controller 550 may be coupled to an L3 cache, which may in turn be coupled to a system memory. In other embodiments, cache/memory controller 550 may be directly coupled to a memory. In some embodiments, cache/memory controller 550 may include one or more internal caches. Memory coupled to controller 550 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 550 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by processor complex 520 to cause device 500 to perform functionality described herein.

I/O bridge 560 may include various elements configured to implement universal serial bus (USB) communications, security, audio, and/or low-power always-on functionality, for example. I/O bridge 560 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 560. For example, these devices may include various types of wireless interfaces (e.g., ones supporting Wi-Fi™, Bluetooth™, cellular, global positioning system, etc.), additional storage (e.g., RAM storage, solid state storage, or disk storage), user interface devices (e.g., keyboard, microphones, speakers, etc.), etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various embodiments described herein may gather and/or use data available from specific and legitimate sources to improve the delivery to users of invitational content or any other content that may be of interest to them. The present disclosure contemplates that, in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

What is claimed is:

1. A non-transitory computer readable medium having program instructions stored therein that are executable by a first computing device to cause the first computing device to perform operations comprising:
   receiving, from a second computing device, a request for information associated with a data field of a process executing on the second computing device;
   in response to receiving the request, using a received location beacon to determine a device proximity value indicative of a distance between the first computing device and the second computing device;
   determining, based on the device proximity value, whether to present a selection prompt that permits a user of the first computing device to select information accessible by the first computing device for transmission to the second computing device; and
   in response to the user selecting information via the selection prompt, wirelessly providing the selected information to the second computing device for entry in the data field of the process executing on the second computing device.

2. The computer readable medium of claim 1, wherein the location beacon is received from a third device distinct from the first and second computing devices.

3. The computer readable medium of claim 2, wherein the third device is a remote for the second computing device.

4. The computer readable medium of claim 3, wherein the location beacon is received wirelessly by the first computing device, and wherein the second computing device and the third device communicate via a wireless interface.

5. The computer readable medium of claim 1, wherein the device proximity value is derived from a relative signal strength indication (RSSI) associated with the received location beacon, and wherein determining whether to present the selection prompt includes comparing the RSSI with a threshold value to determine whether the first and second computing devices are sufficiently close to permit selection of information accessible by the first computing device for transmission to the second computing device.

6. The computer readable medium of claim 1, wherein the information selectable via the selection prompt is stored on the first computing device.

7. The computer readable medium of claim 1, wherein the information accessible by the first computing device includes a user credential for a service associated with the process executing on the second computing device.

8. The computer readable medium of claim 1, wherein the device proximity value is a distance value.

9. A method, comprising:
   receiving, by a first computing device, a request for information associated with a data field of a process executing on a second computing device;
   in response to receiving the request, determining, by the first computing device using a received location beacon by the first computing device, a device proximity value indicative of a distance between the first computing device and the second computing device;

determining, by the first computing device, based on the device proximity value, whether to present a selection prompt that permits a user of the first computing device to select information accessible by the first computing device for transmission to the second computing device; and providing, by the first computing device, the selected information to the second computing device for entry in the data field of the process executing on the second computing device.

10. The method of claim 9, wherein the location beacon is received from a third device distinct from the first and second computing devices.

11. The method of claim 10, wherein the third device is a remote configured to control the second computing device.

12. The method of claim 9, wherein the device proximity value is derived from a relative signal strength indication (RSSI) associated with the received location beacon, and wherein determining whether to present the selection prompt includes comparing the RSSI with a threshold value to determine whether the first and second computing devices are sufficiently close to permit selection of information accessible by the first computing device for transmission to the second computing device.

13. The method of claim 9, wherein the information associated with the data field is information associated with a user.

14. The method of claim 9, wherein the information accessible by the first computing device includes a user credential for a service associated with the process executing on the second computing device.

15. The method of claim 9, further comprising:
receiving, by the first computing device, a different request for information associated with a data field of a process executing on the second computing device; and
ignoring, by the first computing device, the different request in response to determining that the first computing device is not sufficiently close to the second computing device based on another determined device proximity value.

16. A system, comprising:
a first computing device having a first wireless interface; and
a second computing device having a second wireless interface;
wherein the first computing device is configured to:
receive a request for information associated with a data field of a process executing on the second computing device;
in response to receiving the request, determine, using a location beacon received by the first computing device via the first wireless interface, a device proximity value indicative of a distance between the first computing device and the second computing device;
determine, based on the device proximity value, whether to present, to a user of the first computing device, a selection prompt that permits the user to select information accessible by the first computing device for transmission to the second computing device; and
provide, via the first wireless interface, the selected information to the second wireless interface of the second computing device for entry in the data field of the process executing on the second computing device.

17. The system of claim 16, further comprising:
a third device distinct from the first and second computing devices; and
wherein the location beacon is received from the third device.

18. The system of claim 17, wherein the first computing device is a mobile computing device, the second computing device is a media player, and the third device is a remote configured to control the media player.

19. The system of claim 16, wherein the device proximity value is derived from a relative signal strength indication (RSSI) associated with the received location beacon, and wherein determining whether to present the selection prompt includes comparing the RSSI with a threshold value to determine whether the first and second computing devices are sufficiently close to permit selection of information accessible by the first computing device for transmission to the second computing device.

20. The system of claim 16, wherein the first computing device is further configured to:
store user credentials for a plurality of services; and
select one of the stored user credentials for entry in the data field of the process executing on the second computing device.

* * * * *